| United States Patent [19] | [11] 4,028,300 |
|---|---|
| Wake et al. | [45] June 7, 1977 |

[54] COATING COMPOSITION

[75] Inventors: Shigeo Wake; Mikio Futagami, both of Niihama, Japan

[73] Assignee: Sumitomo Chemical Company, Limited, Osaka, Japan

[22] Filed: Sept. 12, 1975

[21] Appl. No.: 613,035

[30] Foreign Application Priority Data

Sept. 13, 1974 Japan .......................... 49-106532

[52] U.S. Cl. ................... 260/31.2 R; 260/32.8 SB; 260/33.2 R; 260/33.4 R; 260/33.6 UA; 260/33.8 SB; 428/450; 428/451; 428/452

[51] Int. Cl.² ..................... C08K 5/01; C08K 5/06; C08K 5/07; C08K 5/09

[58] Field of Search ................. 260/31.2 R, 33.2 R, 260/33.4 R, 33.6 UA, 32.8 SB, 33.8 SB; 526/194, 1, 320

[56] References Cited

UNITED STATES PATENTS

| 3,565,838 | 2/1971 | Atkinson et al. | 260/31.2 R |
|---|---|---|---|
| 3,803,111 | 4/1974 | Munro et al. | 260/31.2 R |
| 3,821,003 | 6/1974 | Dittrich et al. | 260/31.2 R |
| 3,886,129 | 5/1975 | Kurz et al. | 260/31.2 R |

*Primary Examiner*—Harry Wong, Jr.
*Attorney, Agent, or Firm*—Birch, Stewart, Kolasch and Birch

[57] ABSTRACT

A coating composition useful for improving the surface properties, such as surface hardness and chemical resistance, of plastic products, wooden products, metallic products, or the like, which comprises (A) silicon compounds partial hydrolyzates comprising a partial hydrolyzate of a tetraalkoxysilane and a partial hydrolyzate of an organic silicon compound of the formula: $R_nSi(OR')_{4-n}$ wherein R is a hydrocarbon group, R' is an alkyl and n is 1 or 2, and (B) an acrylic copolymer and an etherated methylolmelamine, which are dissolved in a solvent. The coating composition can give a transparent coating film having excellent hardness, water resistance, boiling water resistance, chemical resistance, heat cycle resistance and weatherability, and further antistatic properties onto the formed products.

6 Claims, No Drawings

COATING COMPOSITION

The present invention relates to a coating composition, more particularly to a coating composition useful for improving the surface properties, such as surface hardness and chemical resistance, of plastic products, wooden products, metallic products, or the like.

There have, hitherto, been widely used various plastic formed products, for instance, made of thermoplastic resins, such as polycarbonate, polymethyl methacrylate, polystyrene and polyvinyl chloride, because of their excellent characteristics, such as lightweight properties, easy processabilities, impact resistance, or the like. However, these formed products have soft surface which is readily injured and further is easily swollen or dissolved by contacting with a solvent.

For improving these defects in these formed products, various methods are proposed, for instance, a method of coating thereto a composition comprising as the main components an ethyl silicate hydrolyzate and a copolymr of a fluorine-containing olefinic compound and ω-hydroxyalkyl vinyl ether (U.S. Pat. No. 3,429,845), a method of coating thereto an alkyltrialkoxysilane hydrolyzate (U.S. Pat. No. 3,451,838), or a method of coating thereto a composition comprising as the main components a tetraalkoxysilane partial hydrolyzate and an alkyltrialkoxysilane partial hydrolyzate (Japanese Patent Publication (without examination) No. 56230/1973). However, even by these known methods, the defects can not completely be eliminated, and there has never been found any product satisfying all properties, such as abrasion resistance, boiling water resistance, heat cycle resistance, and preferably further antistatic properties.

The present inventors have proposed a coating composition comprising as the main components polysilicic acid, an acrylic copolymer and an etherated methylolmelamine, which is useful for improving the surface properties of the formed products (Japanese patent application No. 34214/1974). This coating composition can give a coating film having satisfactorily excellent abrasion resistance, water resistance and antistatic properties, but the coating film is somewhat inferior in the boiling water resistance, for instance, when it is immersed into a boiling water of 80° C, the coating film tends to soften.

The present inventors have extensively studied to find a further improved coating composition satisfying all these properties and found that it is useful to add an organic silicon compound to the polysilicic acid component.

An object of the present invention is to provide an improved coating composition useful for improving the surface properties of various formed products.

Another object of the invention is to provide a coating composition having excellent boiling water resistance as well as abrasion resistance, heat cycle resistance and antistatic properties.

A further object of the invention is to provide a method for giving a coating film having excellent chemical and mechanical properties onto the formed products.

These and other objects of the invention will be apparent from the description hereinafter.

According to the new finding by the present inventors, the defect of less boiling water resistance observed in the case of using the partial hydrolyzate of the tetraalkoxysilane alone as the silicon component can be eliminated by using as the silicon component a partial hydrolyzate of a silicon compound of the formula: $R_nSi(OR')_{4-n}$ wherein R is a hydrocarbon group having 1 to 6 carbon atoms, R' is an alkyl group having 1 to 4 carbon atoms, and n is 1 or 2 (hereinafter, referred to as "organic silicon compound") in addition to the partial hydrolyzate of the tetraalkoxysilane.

Besides, when the ratio of the partial hydrolyzate of the organic silicon compound to the partial hydrolyzate of the tetraalkoxysilane is made greater, the boiling water resistance of the coating film produced from the composition tends to become better, but on the other hand, it results in the decrease of the antistatic properties of the coating film and further the curing thereof must be carried out at a higher temperature, which induces the lowering of the abrasion resistance thereof. For instance, when a methyltriethoxysilane partial hydrolyzate is coated onto a methyl methacrylate resin plate, the curing of the coating layer must be carried out at a temperature of 120° C or higher, and further, the coating film obtained after the curing has a good boiling water resistance but no antistatic properties. On the other hand, when the ratio of the partial hydrolyzate of the organic silicon compound to the partial hydrolyzate of the tetraalkoxysilane is made smaller, the coating film shows better antistatic properties and hardness, but loses the flexibility, and as the result, it shows inferior heat cycle resistance. That is, when a sample of the coated product is exposed repeatedly to the atmosphere of various different temperatures (i.e., it is submitted to a heat cycle test), the coating film crazes. In a extreme case, the crazing occurs during the curing step to give an inferior coating film. These defects are eliminated by the coating composition of the present invention, wherein an acrylic copolymer and optionally further an etherated methylolmelamine are contained in addition to the silicon component.

Thus, the present invention provides a coating composition which can give a coating film having excellent properties such as abrasion resistance, boiling water resistance and heat cycle resistance, and further excellent antistatic properties in case of using an appropriate ratio of a silicon component, an acrylic copolymer and an etherated methylolmelamine.

The coating composition of the present invention comprises a. silicon compounds partial hydrolyzates comprising a partial hydrolyzate of a tetraalkoxysilane and a partial hydrolyzate of an organic silicon compound of the formula: $R_nSi(OR')_{4-n}$ wherein R is a hydrocarbon group having 1 to 6 carbon atoms, R' is an alkyl group having 1 to 4 carbon atoms and n is 1 or 2, wherein said partial hydrolyzate of the organic silicon compound of the formula: $R_nSi(OR')_{4-n}$ is contained in an amount of 10 to 100 parts by weight (calculated as $R_nSiO_{4-n/2}$) to 100 parts by weight (calculated as $SiO_2$) of said partial hydrolyzate of the tetraalkoxysilane, b. an acrylic copolymer which is a copolymer of an alkyl acrylate and/or an alkyl methacrylate (hereinafter, referred to as "alkyl (metha)acrylate") and a hydroxyalkyl acrylate and/or a hydroxyalkyl methacrylate (hereinafter, referred to as "hydroxyalkyl (metha)acrylate"), and an etherated methylolmelamine, wherein said acrylic copolymer and said etherated methylolmelamine are contained in an amount of 5 to 200 parts by weight and 0 to 150 parts by weight to 100 parts by weight (calculated as $SiO_2$) of said partial hydrolyzate of the tetraalkoxysilane, respectively, which are dissolved in a solvent.

The silicon compounds partial hydrolyzates used herein mean the product in which at least 20 % of total alkoxy groups contained in the tetraalkoxysilane and the organic silicon compound of the formula: $R_nSi(OR')_{4n}$ are hydrolyzed.

In the present coating composition, the partial hydrolyzate of the organic silicon compound is contained as the silicon component in addition to the partial hydrolyzate of the tetraalkoxysilane compound, and thereby the boiling water resistance of the coating film is improved. The addition amount of the partial hydrolyzate of the organic silicon compound is so small that the excellent abrasion resistance of the coating film is not lost, and the flexibility of the coating film is improved by adding the acrylic copolymer and the etherated methylolmelamine.

The present coating composition shows a good adhesion owing to the acrylic copolymer, and therefore, it can form a coating film having a good adhesion onto the formed products (substrates) made of a homopolymer or copolymer of methyl methaacrylate without any pretreatment. Moreover, the addition of the etherated methylolmelamine is effective for giving both hardness and flexibility to the coating film.

The tetraalkoxysilane used in the present invention contains methoxy, ethoxy, propoxy, butoxy, or the like as the alkoxy group. In the organic silicon compounds of the formula: $R_nSi(OR')_{4n}$, the hydrocarbon group (R) having 1 to 6 carbon atoms may be an organic group, such as methyl, ethyl, propyl, butyl, pentyl, hexyl, vinyl, allyl, phenyl, or the like, and the alkyl group (R') having 1 to 4 carbon atoms may be methyl, ethyl, propyl, butyl, or the like.

The partial hydrolyzates of these silicon compounds may be obtained by hydrolyzing at a temperature of 0° to 100° C for 1 hour to 4 days each or the mixture of the tetraalkoxysilane and the organic silicon compound of the formula: $R_nSi(OR')_{4n}$ in a solvent, such as a mixed solvent of water and an alcohol, in the presence of an acid (e.g., hydrochloric, phosphoric and sulfuric acid; oxalic and maleic acid; acetic and formic acid). The water is used in an amount of ½ by mole or more of the total alkoxy groups contained in the tetraalkoxysilane and the organic silicon compound. Alternatively, the partial hydrolyzates of the silicon compounds may be produced by hydrolyzing directly a chloride of a silicon compound (e.g., $SiCl_4$ or $R_nSiCl_{4n}$). Generally speaking, it is more preferable to cohydrolyze the mixture of the silicon compounds in comparison with hydrolyzing separately each of the silicon compounds and mixing the resultants. Particularly, in case of the organic silicon compound of the formula: $R_nSi(OR')_{4n}$ wherein $n$ is 2, it is more preferably mixed with the tetraalkoxysilane and then co-hydrolyzed.

The silicon component (A) thus obtained contains preferably a mixture of the partial hydrolyzate of the tetraalkoxysilane and the partial hydrolyzate of the organic silicon compound of the formula: $R_nSi(OR')_{4n}$ in the ratio of 10 to 100 parts by weight (calculated as $R_nSiO_{4n/2}$) of at least one partial hydrolyzate of the organic silicon compound to 100 parts by weight (calculated as $SiO_2$) of the partial hydrolyzate of the tetraalkoxysilane. When the partial hydrolyzate of the organic silicon compound is less than 10 parts by weight, the boiling water resistance of the coating film becomes inferior, and on the other hand, when it is more than 100 parts by weight, the hardness of the coating film lowers.

That is, when the number of $n$ in the formula: $R_nSi(OR')_{4-n}$ is larger, the boiling water resistance of the coating film is more improved, but on the other hand, the hardness thereof is more deteriorated and the antistatic properties thereof are more lowered. The improving effect of the boiling water resistance is in the order of $R_2Si(OR')_2 > RSi(OR')_3$, when the same amount of the partial hydrolyzate of the organic silicon compound is used. Accordingly, when the partial hydrolyzate of the organic silicon compound alone is added to the partial hydrolyzate of the tetraalkoxysilane, the mixed ratio of the partial hydrolyzates are preferably as follows:

to 100 parts by weight (calculated as $SiO_2$) of the partial hydrolyzate of the tetraalkoxysilane, in case of $n=1$: 100 to 25 parts by weight (calculated as $RSiO_{1.5}$) of the partial hydrolyzate of the organic silicon compound of the formula: $RSi(OR')_3$, in case of $n=2$: 60 to 10 parts by weight (calculated as $R_2SiO$) of the partial hydrolyzate of the organic silicon compound of the formula: $R_2Si(OR')_2$.

The mixture of the partial hydrolyzates may be, as mentioned hereinbefore, produced by co-hydrolyzing the mixture of the tetraalkoxysilane and the organic silicon compound, or by hydrolyzing separately each of the tetraalkoxysilane and the organic silicon compound and mixing the resulting partial hydrolyzates.

Besides, when two or more kinds of the partial hydrolyzates of the organic silicon compounds are added to the partial hydrolyzate of the tetraalkoxysilane, they tend to show the similar effects on the boiling water resistance, antistatic properties, hardness, or the like of the coating film to those in the case of a single partial hydrolyzate of the organic silicon compound being added, and therefore, the total amount of the partial hydrolyzates of the organic silicon compounds to be added to the partial hydrolyzate of the tetraethoxysilane should be controlled according to the kinds and mixed ratio of the partial hydrolyzates of the organic silicon compounds.

The acrylic copolymer used together with the silicon component in the present invention may be produced by the bulk-polymerization, emulsion polymerization, suspension-polymerization or solution-polymerization of an alkyl (metha)acrylate and a hydroxyalkyl (metha)acrylate in the presence of a radical polymerization initiator (e.g., azobisisobutyronitrile, benzoyl peroxide, di-tert. butyl peroxide, etc.).

Suitable examples of the alkyl (metha)acrylate are (metha)acrylic acid esters of alcohols having 1 to 18 carbon atoms, particularly, ethyl (metha)acrylate, propyl (metha)acrylate, butyl (metha)acrylate, 2-ethylhexyl (metha)acrylate, lauryl (metha)acrylate, or the like.

Suitable examples of the hydroxyalkyl (metha)acrylate are 2-hydroxyethyl (metha)acrylate, hydroxypropyl (metha)acrylate, hydroxybutyl (metha)acrylate, glycerol mono(metha)acrylate, or the like.

The ratio of the alkyl (metha)acrylate and the hydroxyalkyl (metha)acrylate in the acrylic copolymer is not critical, but is preferably in the range of 1/10 to 10/1 by weight in viewpoint of the properties of the coating film produced from the coating composition, such as the adhesion of the coating film to the substrate and the flexibility of the coating film.

The addition amount of the acrylic copolymer is preferably in the range of 5 to 200 parts by weight to 100 parts by weight (calculated as $SiO_2$) of the partial hydrolyzate of the tetraalkoxysilane. When the addition amount of the acrylic copolymer is less than 5 parts by weight, the coating film produced from the coating composition is inferior in the heat cycle resistance and tends to craze, and on the other hand, when it is more than 200 parts by weight, the hardness of the coating film is deteriorated.

The etherated methylolmelamines used in the present invention can be produced by the known methods and many products thereof are commercially available. Suitable examples thereof are hexa(alkoxymethyl)-melamines, such as hexa(methoxymethyl)melamine, hexa(ethoxymethyl)melamine, hexa(propoxymethyl)-melamine, hexa(isopropoxymethyl)melamine, hexa(-butoxymethyl)melamine, hexa(cyclohexyloxymethyl)-melamine, or the like.

The addition amount of the etherated methylolmelamine is preferably in the range of 0 to 150 parts by weight to 100 parts by weight (calculated as $SiO_2$) of the partial hydrolyzate of the tetraalkoxysilane. When the addition amount of the etherated methylolmelamine is more than 150 parts by weight, the adhesion of the coating film, particularly the adhesion in boiling water, is deteriorated.

The solvent used in the present coating composition may be alcohols, ketones, esters, ethers, cellosolves, halide compounds, carboxylic acids, aromatic compounds, or the like, and the most suitable one may be elected in accordance with the kinds of the used polymer substrates, the evaporation rate, or the like. The solvent is used in a wide range of amount and mixed with the components of the present coating composition. Among the solvents, lower alkylcarboxylic acids, such as formic acid, acetic acid, propionic acid, has an effect for increasing the adhesion between the coating film and the substrates and further for preventing the gelation of the coating composition and increasing the stability of the coating composition. Suitable examples are the combination of lower alcohols (e.g., methanol, ethanol, propanol, butanol), lower alkylcarboxylic acids (e.g., formic acid, acetic acid, propionic acid), aromatic compounds (e.g., benzene, toluene, xylene) and cellosolves (e.g., methyl cellosolve, butyl cellosolve). The amount of the solvent is not critical and may be appropriately selected in accordance with the required thickness of the coating film, the coating method, or the like.

The coating composition is coated onto a substrate and then calcined at a temperature of 70° C or higher to give a cured coating film, in which there may be used a cure promoting catalyst, such as acids (e.g., hydrochloric acid, toluenesulfonic acid), organic amines (e.g., triethylamine, tributylamine), metal organic carboxylates (e.g., sodium acetate, sodium propionate), metal thiocyanates (e.g., potassium thiocyanate, sodium thiocyanate), metal nitrites (e.g., sodium nitrite, potassium nitrite), or organic tin compounds (e.g., di-butyl tin-di-2-ethylhexoate, di-butyl tin-dilaurate), for lowering the curing temperature or for shortening the curing time.

Besides, a surfactant may optionally be added to the present coating composition in order to prevent the deterioration of the surface properties of the coating film, such as orange peel surface and shrinkage, particularly in case of a thick coating film being required, and further in order to prevent the runaway of the coating film. Especially, when a small amount of a block copolymer of an alkylene oxide and dimethylsiloxane is added to the present coating composition, a good coating film can be produced.

These cure promoting catalyst and surfactant are used in a small amount and usually it is sufficient to be used in an amount of 5% by weight or less on the basis of the solid component of the composition.

Moreover, if desired, other additives, such as ultraviolet absorbers, colorants (e.g., pigments), or antistatic agents may be added to the present coating composition.

The coating composition of the present invention can be coated onto the substrate by conventional methods, such as spray coating, immersion, brushing, or the like. After coating, the composition is calcined (cured) at a temperature of 70° C or higher to give a transparent coating film having excellent hardness, water resistance, boiling water resistance, chemical resistance, heat cycle resistance and weatherability, and further excellent antistatic properties by controlling optionally the ratio of the components of the coating composition.

The coating composition of the present invention is particularly useful for coating acrylic substrates, but may be also used for coating other various substrates, such as plastic substrates other than acrylic substrates (e.g., those made of polycarbonate resin, polystyrene resin, polyvinyl chloride resin, acrylonitrile-butadiene-styrene resin, polyamide resin, polyester resin), and further, those made of papers, woods, metals, ceramics, or the like. When a good adhesion of the coating film to the substrate is particularly required, it is effective to under-coat previously the substrate with an acrylic primer, such as a solution of polymethyl methacrylate in a solvent, a conventional acrylic lacquer, a thermosetting acrylic paint, or the like.

The present invention is illustrated by the following Examples but not limited thereto. In the Examples, % means % by weight unless otherwise specified.

EXAMPLES 1 to 10

1. Preparation of a solution of co-hydrolyzation products of tetraethoxysilane and methyltriethoxysilane (Component I):

In isopropyl alcohol (70 g) are dissolved tetraethoxysilane (66.7 g) and methyltriethoxysilane (33.3 g). To the solution is added 0.05 N hydrochloric acid (30 g), and the mixture is stirred at room temperature to subject it to at hydrolysis. After the reaction, the mixture is matured at room temperature for 20 hours or more. The resulting solution contains a partial hydrolyzate of tetraethoxysilane (9.6 %, calculated as $SiO_2$) and a partial hydrolyzate of methyltriethoxysilane (6.3%, calculated as $CH_3SiO_{1.5}$).

2. Preparation of a solution of co-hydrolyzation products of tetraethoxysilane and dimethyldiethoxysilane (Component II):

In isopropyl alcohol (70 g) are dissolved tetraethoxysilane (83.3 g) and dimethyldiethoxysilane (16.7 g). To the solution is added 0.05 N hydrochloric acid (30 g), and the mixture is stirred at room temperature to subject it to a hydrolysis. After the reaction, the mixture is matured at room temperature for 20 hours or more. The resulting solution contains a partial hydrolyzate of tetraethoxysilane (12%, calculated as $SiO_2$) and a partial hydolyzate of dimethyldiethoxysilane (4.2%, calculated as $(CH_3)_2SiO$).

3. Preparation of a solution of co-hydrolyzation products of tetraethoxysilane and methyltriethoxysilane (Component III):

In isopropyl alcohol (230 g) are dissolved tetraethoxysilane (225 g) and methyltriethoxysilane (165 g). To the solution is added 0.05 N hydrochloric acid (127 g), and the mixture is refluxed with agitation for 5 hours to subject it to a hydrolysis. After the reaction, the mixture is cooled to room temperature to give a solution of the cohydrolyzation products. The resulting solution contains a partial hydrolyzate of tetraethoxysilane (8.7%, calculated as $SiO_2$) and a partial hydrolyzate of methyltriethoxysilane (8.3%, calculated as $CH_3 SiO_{1.5}$).

4. Preparation of a solution of co-hydrolyzation products of tetraethoxysilane and dimethyldiethoxysilane (Component IV):

In isopropyl alcohol (82 g) are dissolved tetraethoxysilane (126 g) and dimethyldiethoxysilane (13 g). To the solution is added 0.05 N hydrochloric acid (45 g) and the mixture is refluxed with agitation for 3 hours to submit it to a hydrolysis. After the reaction, the mixture is cooled to room temperature to give a solution of the co-hydrolyzation products. The resulting solution contains a partial hydrolyzate of tetraethoxysilane (13.7%, calculated as $SiO_2$) and a partial hydrolyzate of dimethyldiethoxysilane (2.4%, calculated as $(CH_3)_2SiO$).

5. Production of acrylic copolymers:

a. In ethyl alcohol (300 g) are dissolved butyl acrylate (40 g), 2-hydroxyethyl methacrylate (10 g) and azobisisobutyronitrile (0.5 g). The mixture is stirred at 70° C for 5 hours under nitrogen gas to subject it to a polymerization reaction. After the reaction, the solvent is distilled off and the resulting residue is poured into petroluem ether and thereby the unreacted monomer is removed to give Copolymer (a).

b. Ethyl acrylate (50 g) and 3-hydroxypropyl methacrylate (10 g) are copolymerized in the same manner as described in the above a) to give Copolymer (b).

c. In ethyl alcohol (250 g) are dissolved lauryl acrylate (20 g), butyl acrylate (20 g), 2-hydroxyethyl acrylate (10 g) and azobisisobutyronitrile (0.1 g), and the mixture is copolymerized in the same manner as described in the above a) to give Copolymer (c).

6. Preparation of coating compositions:

The above-obtained Components I, II, III and/or IV, the Copolymer (a), (b) and/or (c), hexa(butoxymethyl)melamine and other additives (e.g. a cure promoting agent and a surfactant) are mixed in the ratio as mentioned in Table 1. The mixture is dissolved in n-butanol (60 parts by weight), acetic acid (40 parts by weight) and xylene (20 parts by weight) to give the coating compositions.

7. Coating and tests of the properties of the coated products:

Polymethyl methacrylate sheet (thickness: 3 mm, trade name: Sumipex-000, made by Sumitomo Chemical Company, Limited) is washed with water and ethanol, and thereon is coated the above-obtained coating compositions. The coated products are cured with a hot-air drier at 80° C for 2 hours.

The polymethyl methacrylate sheets thus coated are subjected to the following tests:

i. Adhesion:

A number of nicks which reach to the substrates are made to the coating film so that a hundred of cells having 1 mm² are formed, and thereon is bonded a cellophane tape (trade name: Cellotape, made by Sekisui Chemical Co., Ltd.), and thereafter, the cellophane tape is strongly peeled off in the direction of 90° upward. The adhesion of the coating film is evaluated by the number of the remaining cells.

ii. Abrasion resistance:

The surface of the coating film is rubbed with No. 000 steel wool. The abrasion resistance is evaluated by the difficulty to be scratched.

A: No scratch is made on the coating film even by strong rubbing.

B: Little scratches are made by strong rubbing.

C: Scratches are made even by weak rubbing.

The polymethyl methacrylate sheet with no coating is ranked as C.

iii. Boiling water resistance:

The coated products are immersed in a boiling water of 80° C for 30 minutes, and thereafter, the state of the coating film is observed.

iv. Antistatic properties:

The antistatic properties of the products are evaluated by so-called ash test, i.e., a sample is rubbed with a velvet rubbing cloth and then degree of attracting ashes of cigarette is observed.

A: No attraction of ashes of cigarette is observed, i.e., the antistatic effect is very good.

B: At first, a little ashes are attracted, but within 1 minutes it becomes not to attract the ashes.

C: A large amount of ashes are attracted, i.e., the product has no antistatic effect.

The polymethyl methacrylate sheet with no coating is ranked as C.

v. Heat cycle test:

A sample is immersed by turns into a boiling water of 80° C and an ice-salt water of −20° C for each 10 seconds, which are repeated ten times, and thereafter, the state of the coating film is observed.

Reference Examples 1 to 3

In the same manner as described in the Examples 1 to 10, Reference coating compositions are prepared and subjected to the various tests as well.

The results as mentioned above are shown in the following Table 1.

Table 1

| | Component (A) | | | | Component (B) | | Additives | |
| | Compound I (part by weight) | Compound II (part by weight) | Compound III (part by weight) | Compound IV (part by weight) | Copolymer | | Melamine*¹ | |
| Example No. | | | | | Kind | Amount (part by weight) | Amount (part by weight) | Kind | Amount (part by weight) |
|---|---|---|---|---|---|---|---|---|---|
| 1 | 100 | — | — | — | a | 6 | 2 | Sodium acetate | 0.4 |
| 2 | 100 | — | — | — | b | 10 | — | ″ | 0.4 |
| 3 | 100 | 100 | — | — | a | 10 | 5 | ″ | 0.4 |
| Ref.Ex. 1 | 100 | — | — | — | — | — | — | ″ | 0.4 |

Table 1-continued

| | | | | | | | | | | |
|---|---|---|---|---|---|---|---|---|---|---|
| 4 | — | 100 | — | — | a | 10 | 5 | " | | 0.4 |
| 5 | — | 100 | — | — | a | 6 | 2 | 1N Hydro-chloric acid | | 2 |
| 6 | — | 100 | — | — | b | 20 | — | " | | 2 |
| Ref.Ex. 2 | — | 100 | — | — | — | — | — | Sodium acetate | | 0.4 |
| 7 | — | — | 100 | — | a | 6 | 2 | " | | 0.4 |
| 8 | — | — | 100 | — | b | 10 | — | Potassium thiocyanate | | 0.4 |
| 9 | — | — | — | 100 | a | 7 | 2 | 41 | | 0.4 |
| 10 | — | — | — | 100 | c | 6 | 3 | Potassium thiocyanate NUC Silicone*² Y 7006 | | 0.4 0.2 |
| Ref.Ex. 3 | — | — | — | 100 | — | — | 5 | " " | | 0.4 0.2 |

| Example No. | Appearance of the coating film after curing | Adhesion | Abrasion resistance | Boiling water resistance | Antistatic effect | Heat cycle test |
|---|---|---|---|---|---|---|
| 1 | Excellent | 100/100 | A | Excellent | B | Excellent |
| 2 | Excellent | 100/100 | A | Excellent | B | Excellent |
| 3 | Excellent | 100/100 | A | Excellent | A | Excellent |
| Ref.Ex. 1 | Crazing | 100/100 | A | Increase of crazing | A | Increase of crazing |
| 4 | Excellent | 100/100 | B | Excellent | B | Excellent |
| 5 | Excellent | 100/100 | A | Excellent | A | Excellent |
| 6 | Excellent | 100/100 | B | Excellent | B | Excellent |
| Ref.Ex. 2 | Crazing | 100/100 | A | Crazing | A | Crazing |
| 7 | Excellent | 100/100 | A | Excellent | C | Excellent |
| 8 | Excellent | 100/100 | B | Excellent | C | Excellent |
| 9 | Excellent | 100/100 | A | Excellent | A | Excellent |
| 10 | Excellent | 100/100 | A | Excellent | A | Excellent |
| Reg.Ex. 3 | a little crazing | 100/100 | A | Increase of crazing | A | Increase of crazing |

*¹The melamine is hexa(butoxymethyl)melamine.
*²NUC Silicone Y 7006 is a surfactant made by Nippon Unicar Co.

What is claimed:

1. A coating composition comprises
   A. silicon compounds partial hydrolyzates comprising at least one partial hydrolyzate of a tetraalkoxysilane and at least one partial hydrolyzate of an organic silicon compound of the formula: $R_nSi(OR')_{4-n}$ wherein R is a hydrocarbon group having 1 to 6 carbon atoms, R' is an alkyl group having 1 to 4 carbon atoms and n is 1 or 2, wherein said partial hydrolyzate of the organic silicon compound of the formula: $R_nSi(OR')_{4-n}$ is contained in an amount of 10 to 100 parts by weight (calculated as $R_nSiO_{4-n/2}$) to 100 parts by weight (calculated as $SiO_2$) of said partial hydrolyzate of the tetraalkoxysilane,
   B. an acrylic copolymer which is a copolymer of an alkyl acrylate and/or an alkyl methacrylate and a hydroxyalkyl acrylate and/or a hydroxyalkyl methacrylate, wherein the ratio of alkyl (metha)acrylate and the hydroxyalkyl (metha)-acrylate is in the range of 1/10 to 10/1 by weight and said acrylic copolymer is contained in an amount of 5 to 200 parts by weight to 100 parts by weight (calculated as $SiO_2$) of said partial hydrolyzate of the tetraalkoxysilicon, and
   C. an etherated methylolmelamine, which is contained in an amount of 0 to 150 parts by weight to 100 parts by weight (calculated as $SiO_2$) of said partial hydrolyzate of the tetraalkoxysilicon, which are dissolved in a solvent selected from the group consisting of an alcohol, a ketone, an ester, an ether, a cellosolve, a halide compound, a carboxylic acid, an aromatic compound and a mixture thereof.

2. The coating composition according to claim 1, wherein the partial hydrolyzate of the organic silicon compound is a partial hydrolyzate of an organic silicon compound of the formula: $RSi(OR')_3$ wherein R is a hydrocarbon group having 1 to 6 carbon atoms and R' is an alkyl group having 1 to 4 carbon atoms, and said partial hydrolyzate of the organic silicon compound is contained in the ratio of 100 to 25 parts by weight (calculated a $RSiO_{1.5}$) to 100 parts by weight (calculated as $SiO_2$) of the partial hydrolyzate of the tetraalkoxysilane.

3. The coating composition according to claim 1, wherein the partial hydrolyzate of the organic silicon compound is a partial hydrolyzate of an organic silicon compound of the formula: $R_2Si(OR')_2$ wherein R is a hydrocarbon group having 1 to 6 carbon atoms and R' is an alkyl group having 1 to 4 carbon atoms, and said partial hydrolyzate of the organic silicon compound is contained in the ratio of 60 to 10 parts by weight (calculated as $R_2SiO$) to 100 parts by weight (calculated as $SiO_2$) of the partial hydrolyzate of the tetraalkoxysilane.

4. The coating composition according to claim 1, wherein the tetraalkoxysilane is the one wherein the alkoxy group is a member selected from the group consisting of methoxy, ethoxy, propoxy and butoxy.

5. The coating composition according to claim 1, wherein the silicon compounds partial hydrolyzates are those obtained by co-hydrolyzing the mixture of at least one tetraalkoxysilane and at least one organic silicon compound of the formula: $R_nSi(OR')_{4-n}$ wherein R is a hydrocarbon group having 1 to 6 carbon atoms, R' is an alkyl group having 1 to 4 carbon atoms and n is 1 or 2 with an acid in a solvent.

6. The coating composition according to claim 1, wherein the solvent is a member selected from the group consisting of methanol, ethanol, propanol, butanol, formic acid, acetic acid, propionic acid, benzene, toluene, xylene, methyl cellosolve, butyl cellosolve, and the mixtures thereof.

* * * * *